US012574761B2

(12) United States Patent     (10) Patent No.:   US 12,574,761 B2

Ho et al.     (45) Date of Patent:    Mar. 10, 2026

(54) MULTI-AP ASSOCIATION IDENTIFIERS MANAGEMENT

(71) Applicant: QUALCOMM Incorporated, San Diego, CA (US)

(72) Inventors: Sai Yiu Duncan Ho, San Diego, CA (US); George Cherian, San Diego, CA (US); Alfred Asterjadhi, San Diego, CA (US); Abhishek Pramod Patil, San Diego, CA (US); Abdel Karim Ajami, Lakeside, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 18/149,638

(22) Filed: Jan. 3, 2023

(65) Prior Publication Data

US 2024/0224076 A1     Jul. 4, 2024

(51) Int. Cl.
    *H04W 88/08*       (2009.01)
    *H04W 24/02*       (2009.01)
(52) U.S. Cl.
    CPC ................................. *H04W 24/02* (2013.01)
(58) Field of Classification Search
    CPC ..... H04W 84/12; H04W 72/12; H04W 74/08; H04W 74/0808; H04W 28/06; H04W 28/10; H04W 40/02; H04W 76/15; H04W 24/02; H04W 28/02; H04W 28/08; H04W 36/00; H04W 36/08; H04W 36/28; H04W 52/02; H04W 72/121; H04W 72/20; H04W 74/04; H04W 74/0816

See application file for complete search history.

(56) References Cited

U.S. PATENT DOCUMENTS

| | | | | |
|---|---|---|---|---|
| 2019/0306710 | A1* | 10/2019 | Cammarota | .......... H04W 12/06 |
| 2021/0120612 | A1* | 4/2021 | Park | ...................... H04W 76/11 |
| 2021/0250848 | A1* | 8/2021 | Seok | .................... H04W 48/16 |
| 2021/0314846 | A1* | 10/2021 | Chu | ................... H04W 40/244 |
| 2022/0053376 | A1* | 2/2022 | Yang | ................. H04W 28/0838 |

FOREIGN PATENT DOCUMENTS

| | | |
|---|---|---|
| EP | 3955618 A2 | 2/2022 |
| EP | 3955649 A1 | 2/2022 |

OTHER PUBLICATIONS

International Search Report and Written Opinion dated Mar. 12, 2024 from corresponding PCT Application No. PCT/US2023/079064.

* cited by examiner

*Primary Examiner* — Quan M Hua
(74) *Attorney, Agent, or Firm* — ArentF ox Schiff, LLP

(57)          ABSTRACT

This disclosure provides methods, components, devices and systems for multiple access point (AP) association with a single station (STA) to provide a seamless transition (e.g., little to no service interruption during an active link transfer). Some aspects more specifically relate to an AP multi-link device (MLD) and multiple AP members of the AP MLD, and their communications with the STA.

17 Claims, 12 Drawing Sheets

500

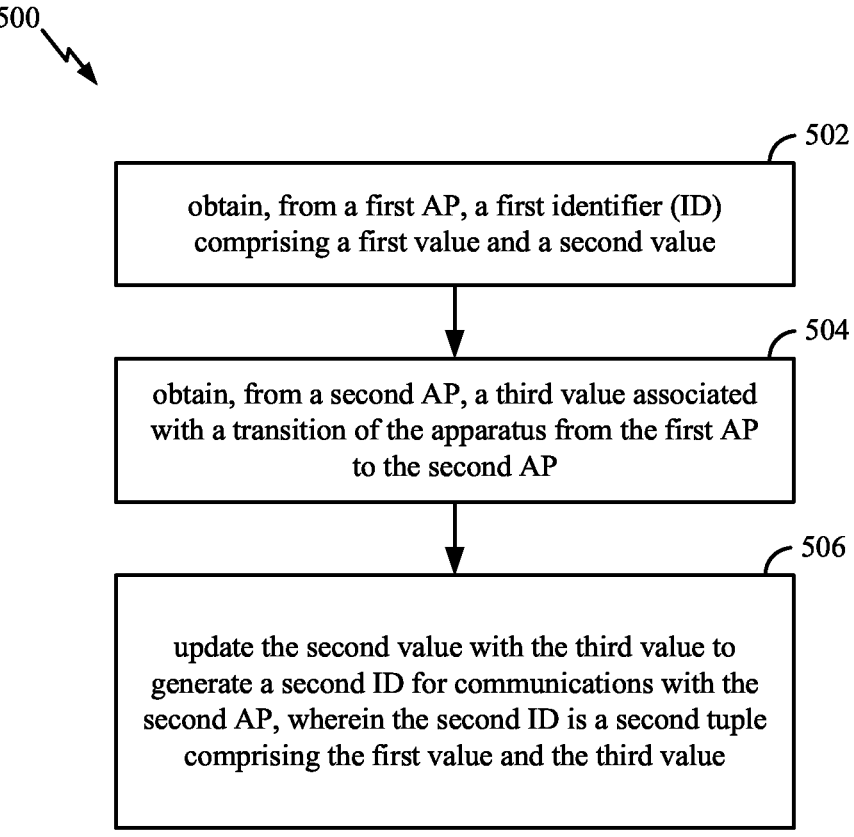

502 obtain, from a first AP, a first identifier (ID)
comprising a first value and a second value

504 obtain, from a second AP, a third value associated
with a transition of the apparatus from the first AP
to the second AP

506 update the second value with the third value to
generate a second ID for communications with the
second AP, wherein the second ID is a second tuple
comprising the first value and the third value

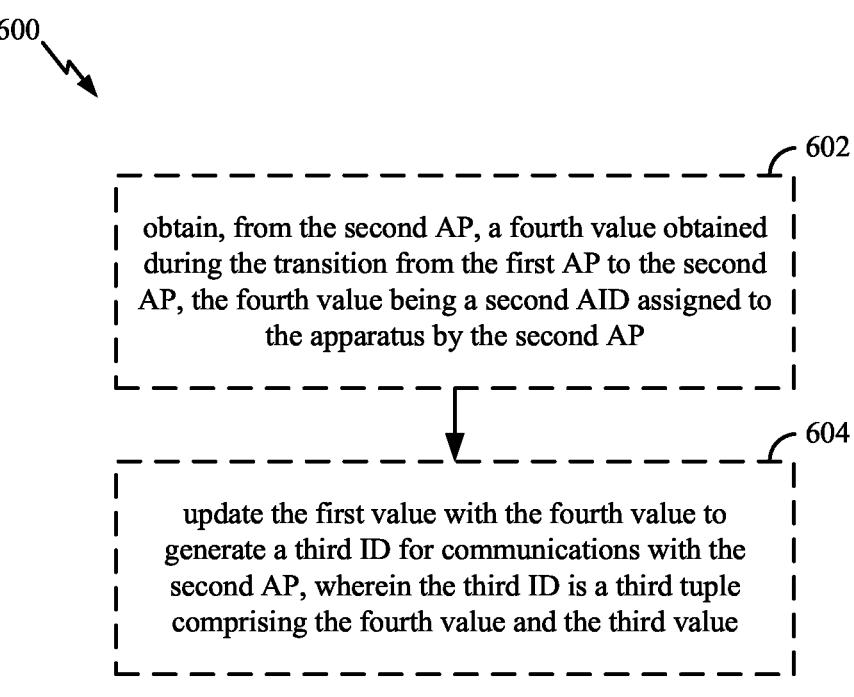

602 obtain, from the second AP, a fourth value obtained during the transition from the first AP to the second AP, the fourth value being a second AID assigned to the apparatus by the second AP

604 update the first value with the fourth value to generate a third ID for communications with the second AP, wherein the third ID is a third tuple comprising the fourth value and the third value

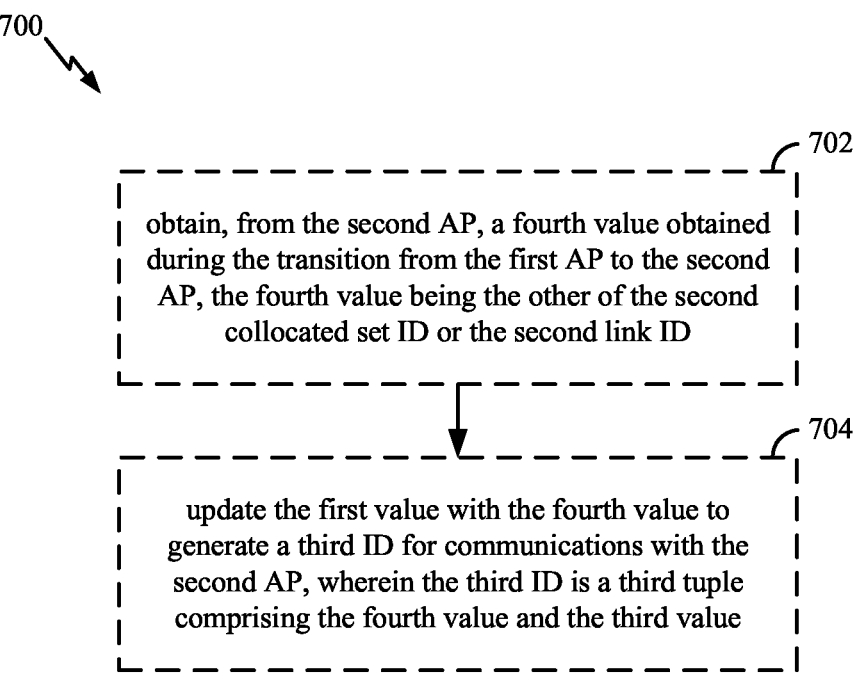

702 obtain, from the second AP, a fourth value obtained during the transition from the first AP to the second AP, the fourth value being the other of the second collocated set ID or the second link ID

704 update the first value with the fourth value to generate a third ID for communications with the second AP, wherein the third ID is a third tuple comprising the fourth value and the third value

902 generate a first tuple comprising a first value and a second value, wherein the first tuple is configured as one of a first extended association identifier (AID) or a first extended link identifier (ID)

904 output, for transmission to a first non-access point (AP) multi-link device (MLD), the first tuple

1000

1002 generate a first tuple comprising a first value and a second value, wherein the first tuple is configured as one of a first extended association identifier (AID) or a first extended link identifier (ID)

1004 output, for transmission to a first non-access point (AP) multi-link device (MLD), the first tuple

1100

MULTI-AP ASSOCIATION IDENTIFIERS MANAGEMENT

TECHNICAL FIELD

This disclosure relates generally to wireless communication, and more specifically, to communications between non-access point (AP) multi-link devices (MLDs) and APs.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs) (e.g., non-AP MLDs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, multiple APs may: be grouped as a physically collocated entity, form a logical entity wherein the multiple APs are non-collocated, or both. Typically, when an STA roams or moves to a new area, the STA disassociates with a current AP, then associates and performs authentication with a new AP that provides a stronger signal. However, reassociation between the STA and the new AP may require at least a 4-way handshake that can take a substantial amount of time to complete. Thus, a service interruption may occur during a reassociation process, as an STA disassociates with a current AP and associates and authenticates with a new AP. Improved operation may be desirable, at least in some cases.

SUMMARY

The systems, methods and devices of this disclosure each have several innovative aspects, no single one of which is solely responsible for the desirable attributes disclosed herein.

Certain aspects are directed to an apparatus configured for wireless communication. The apparatus includes a memory comprising instructions and one or more processors configured to execute the instructions. In some examples, the instructions are configured to cause the apparatus to obtain, from a first AP, a first identifier (ID) comprising a first value and a second value. In some examples, the instructions are configured to cause the apparatus to obtain, from a second AP, a third value associated with a transition of the apparatus from the first AP to the second AP. In some examples, the instructions are configured to cause the apparatus to update the second value with the third value to generate a second ID for communications with the second AP, wherein the second ID is a second tuple comprising the first value and the third value.

Certain aspects are directed to an apparatus configured for wireless communication. The apparatus includes a memory comprising instructions one or more processors configured to execute the instructions. In some examples, the instructions are configured to cause the apparatus to generate a first tuple comprising a first value and a second value, wherein the first tuple is configured as one of a first extended association identifier (AID) or a first extended link identifier (ID). In some examples, the instructions are configured to cause the apparatus to output, for transmission to a first non-access point (AP) multi-link device (MLD), the first tuple.

Certain aspects are directed to a method for wireless communication at a non-access point (AP) multi-link device (MLD). In some examples, the method includes obtaining, from a first AP, a first identifier (ID) comprising a first value and a second value. In some examples, the method includes obtaining, from a second AP, a third value associated with a transition of the non-AP MLD from the first AP to the second AP. In some examples, the method includes updating the second value with the third value to generate a second ID for communications with the second AP, wherein the second ID is a second tuple comprising the first value and the third value.

Certain aspects are directed to a method of wireless communication at an access point (AP). In some examples, the method includes generating a first tuple comprising a first value and a second value, wherein the first tuple is configured as one of a first extended association identifier (AID) or a first extended link identifier (ID). In some examples, the method includes outputting, for transmission to a first non-access point (AP) multi-link device (MLD), the first tuple.

Certain aspects are directed to an apparatus for wireless communication. In some examples, the apparatus includes means for obtaining, from a first AP, a first identifier (ID) comprising a first value and a second value. In some examples, the apparatus includes means for obtaining, from a second AP, a third value associated with a transition of the apparatus from the first AP to the second AP. In some examples, the apparatus includes updating the second value with the third value to generate a second ID for communications with the second AP, wherein the second ID is a second tuple comprising the first value and the third value.

Certain aspects are directed to an apparatus of wireless communication. In some examples, the apparatus includes means for generating a first tuple comprising a first value and a second value, wherein the first tuple is configured as one of a first extended association identifier (AID) or a first extended link identifier (ID). In some examples, the apparatus includes means for outputting, for transmission to a first non-access point (AP) multi-link device (MLD), the first tuple.

Certain aspects are directed to a non-transitory computer-readable medium comprising instructions that, when executed by an apparatus, cause the apparatus to perform a method. In some examples, the method includes obtaining, from a first AP, a first identifier (ID) comprising a first value and a second value. In some examples, the method includes obtaining, from a second AP, a third value associated with a transition of the apparatus from the first AP to the second AP. In some examples, the method includes updating the second value with the third value to generate a second ID for communications with the second AP, wherein the second ID is a second tuple comprising the first value and the third value.

Certain aspects are directed to a non-transitory computer-readable medium comprising instructions that, when executed by an apparatus, cause the apparatus to perform a method. In some examples, the method includes generating a first tuple comprising a first value and a second value, wherein the first tuple is configured as one of a first extended association identifier (AID) or a first extended link identifier (ID). In some examples, the method includes outputting, for transmission to a first non-access point (AP) multi-link device (MLD), the first tuple.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5 shows a flowchart illustrating an example process performable by an MLE via a wireless AP that supports multi-AP association.

FIG. 6 shows a flowchart illustrating an example process performable by a wireless AP that supports multi-AP association.

FIG. 7 shows a flowchart illustrating an example process performable by a wireless STA that supports multi-AP association.

Like reference numbers and designations in the various drawings indicate like elements.

DETAILED DESCRIPTION

Figure 1:
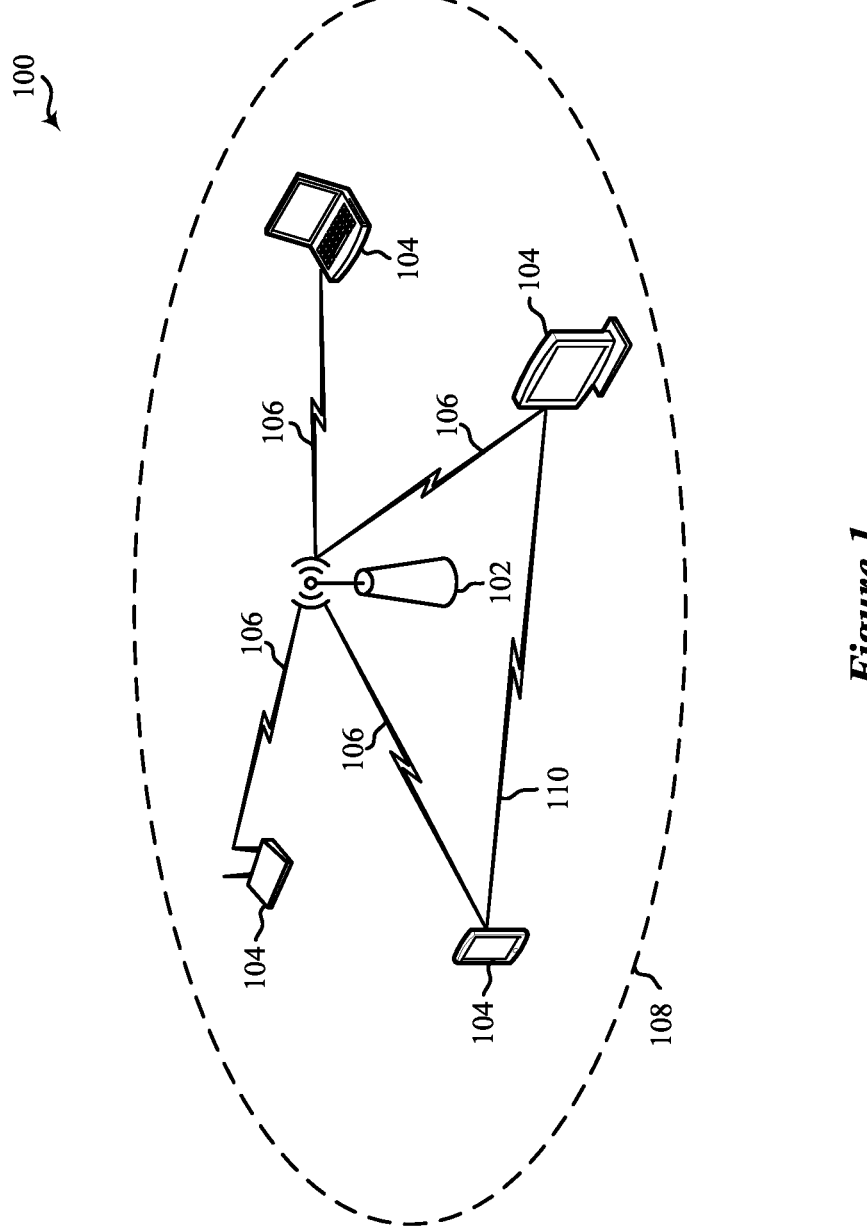
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication and more particularly to seamless communications between a station (STA) (e.g., non-AP MLD) and multiple access points (APs). Typically, when moving from one AP to another, the STA has to re-associate with a new AP. That is, communication with a first AP is interrupted (e.g., service disruption), and all the state information and data associated with the STA and the first AP is lost. Thus, aspects are directed to methods and apparatus for transitioning to a new AP (e.g., a second AP) while maintaining an active communication link between the STA and the first AP. In other words, aspects are directed to transferring a data path to the new AP without interruption.

In some examples (e.g., industrial internet of things (IIoT)), multiple APs may operate in a localized space. Here, the multiple APs may be collocated and/or physically separated within this space. The multiple APs may form a logical group of APs (e.g., a multi-link entity (MLE)/multi-AP entity (MAE)) and/or a physically collocated group of APs. The multiple APs may communicate with one or more mobile STAs. The one or more of STAs and the multiple APs may be multi-link devices (MLDs).

The 802.11be MLO framework may allow a non-AP MLD (e.g., STA) to switch links with reduced signaling overhead and delay if the multiple APs form a single AP MLD (e.g., logical group/physical group). Such an approach would allow a make-before-break data path switch that enables seamless transition of the mobile non-AP MLD to another AP with no (or minimal) communication interruption.

In one example, an STA may be associated with a first AP of the AP MLD group, where the first AP is physically closest to the STA relative to other APs of the AP MLD group. Thus, the STA may have an active communication link with the first AP, and the first AP may host the MLD context of the AP MLD group for the STA. As the STA moves, it may approach a second AP of the AP MLD group while moving away from the first AP. This movement may trigger a roaming or transition event, whereby the STA is configured by the first AP to establish another active link with the second AP while also maintaining the current active link with the first AP.

In some examples, the STA may receive duplicate/redundant packets via both the active links during the transition between APs. That is, the first AP may transmit a packet to the STA via its active link while the second AP also transmits the same packet to the STA via its active link. Such an operation may ensure that the packet is reliably received by the STA as it moves away from the first AP. Upon completion of the transition, the STA may no longer have an active link with the first AP, and downlink data communications may be re-routed to the second AP.

In certain aspects, an AP may assign an association identifier (AID) to an STA when the STA associates with the AP. Typically the AID is a 3-4 bit value; however, if there are multiple APs associated with an AP MLD, an AID value may require a larger bit count to ensure uniqueness among the multiple APs. Thus, in some examples, the AID may be extended from a 3-4 bit value to a larger value (e.g., 16-bit) to ensure a unique AID is assigned to STAs that associate with the multiple APs of the AP MLD.

In certain aspects, an AP of an AP MLD may assign an STA an extended AID corresponding to a collocated set. For example, the extended AID may include both an AID value and a value corresponding to a collocated set of links that the STA uses for communication with the AP.

In certain aspects, an AP of an AP MLD may assign an STA an extended link ID to ensure that the STA has a unique link ID in a scenario where the AP MLD comprises multiple APs. The extended link ID may include additional bits in addition to the link ID, for example, bits associated with a collocated set ID.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102, wherein the APs can be physically collocated (e.g., members of the same AP MLD) or physically not collocated (i.e., members of different AP MLDs). AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IOT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (us)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHZ or 6 GHZ bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Figure 2:
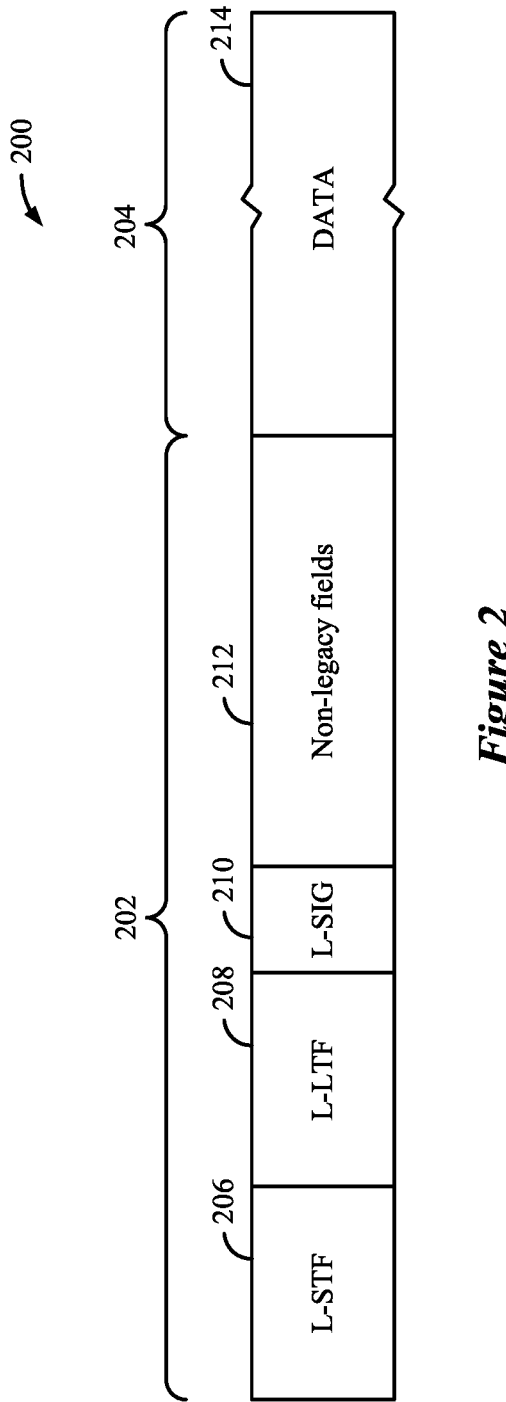
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
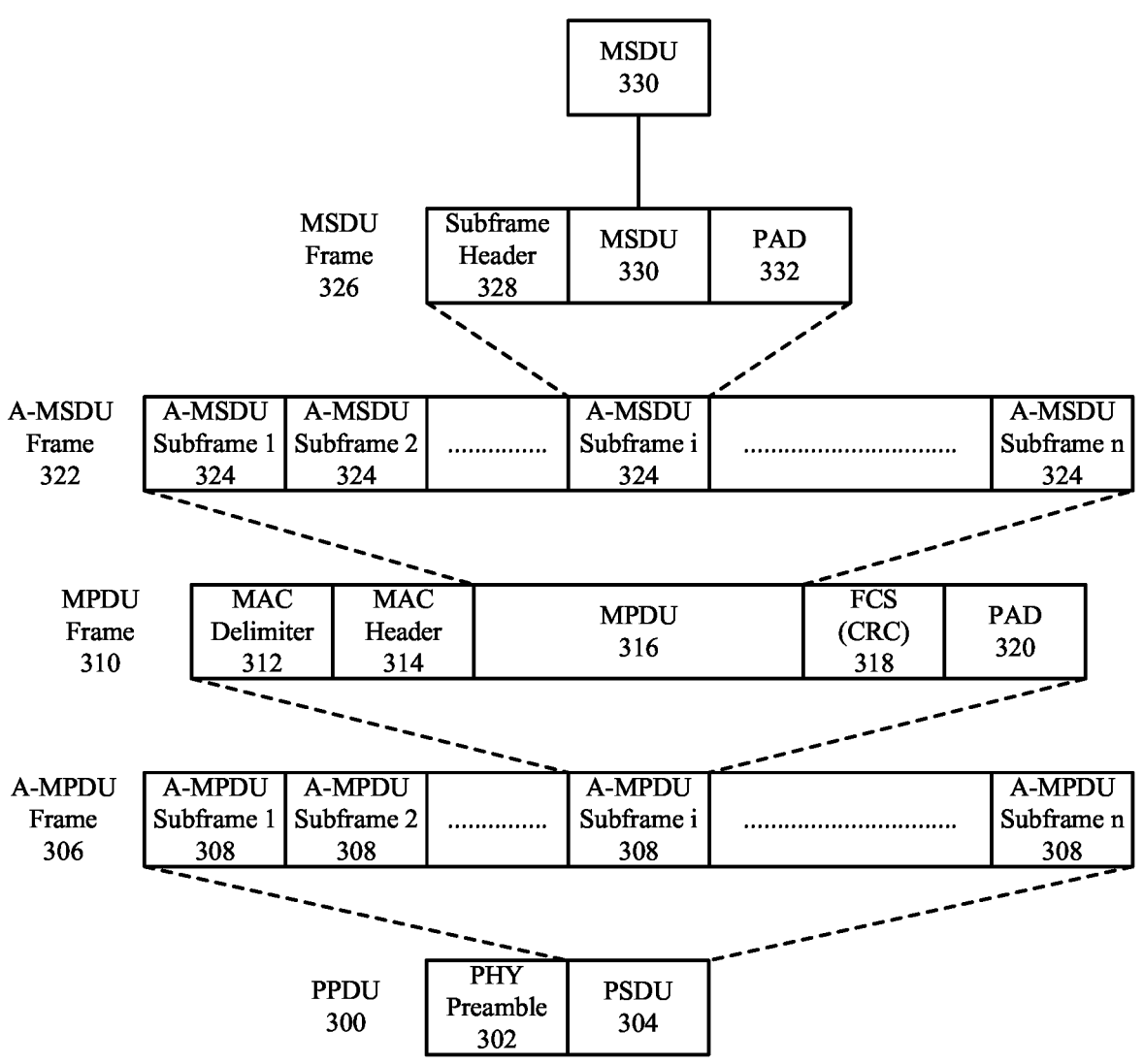
FIG. 3 shows a hierarchical format of an example PPDU usable for communications between a wireless access point (AP) and one or more wireless stations (STAs).

FIG. 3 shows a hierarchical format of an example PPDU usable for communications between a wireless AP 102 and one or more wireless STAs 104. As described, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 also may include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported STA/MLO capability information (such as supported aggregation type or supported frequency bands, among other information). For example, an STA capability may be provided to an AP as a communication parameter. Such STA capabilities may include bandwidth(s) (BW) that the STA can communicate over, modulation and coding scheme(s) (MCS) that the STA is capable of using, an indication of a number of spatial streams (NSS) the STA supports, what 802.11 amendment the STA supports (e.g., HE, EHT, UHR), whether the STA supports capabilities such as: spatial reuse, target wake time and its variants (e.g., individual, broadcast, restricted, multi-link operation (col-located)), what multilink mode (e.g., multi link single radio (MLSR, enhanced c(MLSR), multi link multi radio (MLMR), enhanced MLMR, non-simultaneous transmit receive (NSTR)/STR) is supported by the STA, whether the STA supports TID-to-link mapping, and any other suitable information.

In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Examples of Multiple AP Association

Figure 4:
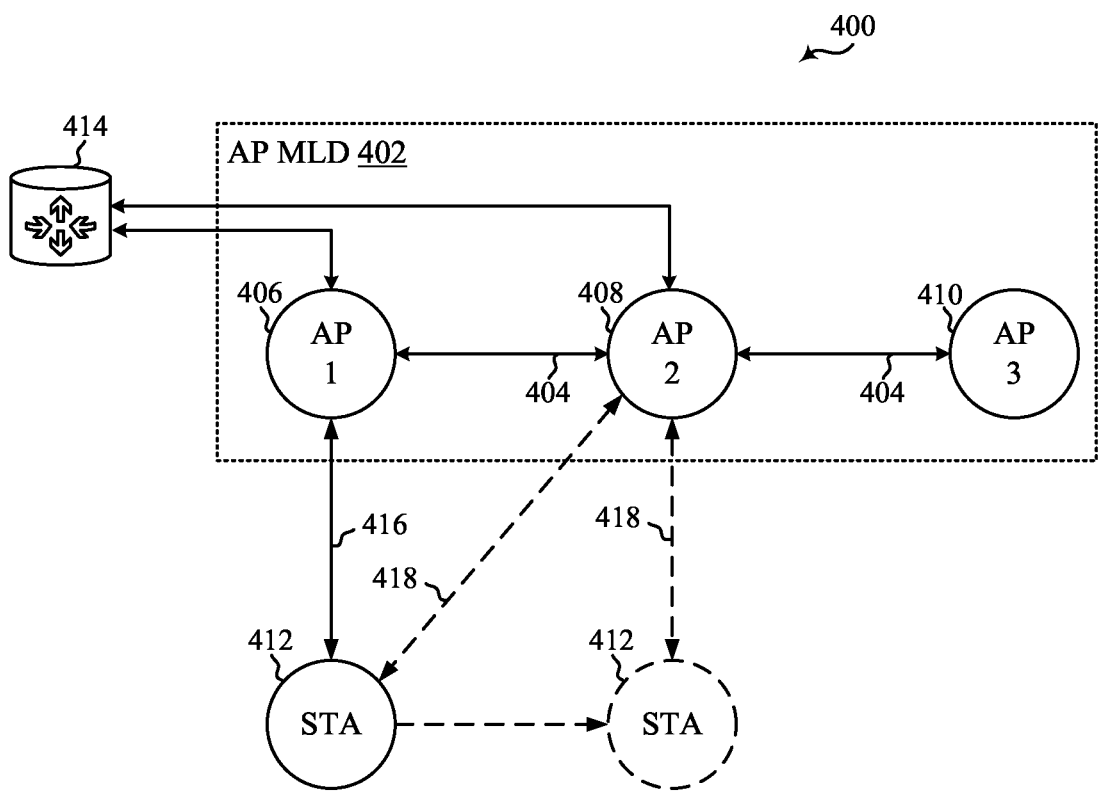
FIG. 4 shows an example network formed by an AP multi-link device (MLD) containing multiple APs and a station (STA).

FIG. 4 shows a pictorial diagram of another example wireless communication network 400. According to some aspects, the wireless communication network 400 can be an example of a mesh network, an IoT/IIoT network or a sensor network in accordance with one or more of the IEEE 802.11 family of wireless communication protocol standards (including the 802.11ah amendment). The wireless network 400 may include multiple APs (e.g., first AP 406, second AP 408, third AP 410) that are members of an AP MLD 402 in communication with a mobile STA 412. The multiple APs may form a logical AP MLD and/or a physical AP MLD. For example, two or more of the APs may be physically collocated as a single entity, or each of the APs may be non-collocated relative to the other APs. The multiple APs and may communicate with each other via backhaul links 404, and to a server via a router 414. The APs and STA may be multi-link devices.

The STA 412 may communicate with the multiple APs via wireless communication links. As illustrated, the STA 412 may communicate with the first AP 406 via a first active link 416, whereas the STA 412 may also establish one or more additional active links with other APs as it moves closer to the other APs and away from the first AP 406. In some examples, the wireless communication links include Bluetooth links or other PAN or short-range communication links.

In some examples, the STA 412 and/or one or more of the multiple APs may also be configured for wireless communication with other networks such as with a Wi-Fi WLAN or a wireless (for example, cellular) wide area network (WWAN), which may, in turn, provide access to external networks including the Internet. For example, the first AP 406 may associate and communicate with an external node via a WLAN network, which also may serve the STA 412. In some examples, one or more of the multiple APs may be configured as a network gateway, for example, an IoT gateway. In such a manner, an AP may serve as an edge network bridge providing a Wi-Fi core backhaul for the AP MLD 402. In some examples, an AP can analyze, preprocess and aggregate data received from the STA 412, and transmit the data to other APs via a backhaul link 404 or external networks via the router 414. Each AP may communicate with an STA using the same and/or different channels relative to another AP.

In certain aspects, the backhaul links 404 may be used by the APs to facilitate transmission of data links from one AP to another without service interruption. In one example, a "light" backhaul process may be used where the STA 412 is configured to perform association with multiple APs. Here, a single AP (e.g., the first AP 406) may be designated as a serving AP. The serving AP may be configured to maintain a block ACK (BA) scoreboard and operational context (e.g., communication parameters associated with the STA 412 and the first AP 406). Thus, the STA 412 may associate (e.g., establish an active communication link) with the first AP 406, and the first AP 406 may operate as a serving AP. A mobile STA 412 may move to a location where signaling from the second AP 408 is higher quality relative to the signaling of the first AP 406 (e.g., the receive signal strength of packets sent by the second AP is higher compared to the receive signal strength of packets sent by the first AP). It should be noted that in some examples, one or more APs may be mobile. Thus, a mobile AP may also affect the strength of AP signaling from the perspective of an STA. When the STA 412 senses that signaling from a second AP 408 is stronger than the first AP 406, or if the STA 412 anticipates that the second AP 408 will provide higher quality signaling based on its location and movement of the STA 412, the first AP 406 may transfer the context and BA scoreboard to the second AP 408 and the second AP 408 may become the serving AP. In this manner, active links may be switched back and forth quickly and without service disruption.

In some examples, a "heavy" backhaul process may be used. In this example, multiple APs may serve a single STA 412. For example, the first AP 406 and the second AP 408 may both serve the STA 412 and both APs may maintain their own local BA scoreboard associated with communications between the STA 412 and the respective AP. Because multiple APs serve the STA 412, the STA 412 may transmit an uplink PPDU to any of the serving APs, and either of the APs may transmit downlink PPDUs to the STA on any available link.

To facilitate scanning and discovery by the STA 412, one or more of the multiple APs may advertise communication parameters such as basic service set (BSS) parameters and/or MLD parameters associated with each of the multiple APs or a subset of the multiple APs. For example, the first AP 406 of the multiple APs may periodically broadcast communication parameters of each of the multiple APs. In some examples, the first AP 406 may advertise parameters only for APs that are members of the AP MLD 402 or may include APs that are outside of the AP MLD 402 but neighbor the first AP 406. In some examples, the first AP 406 may advertise the parameters via a management frame, such as for example a beacon frame, or a probe response frame.

APs that are members of the AP MLD 402 may advertise communication parameters in a reduced neighbor report (RNR) information element (IE) and/or a multi-link IE, or a neighbor report element. A co-located AP subfield setting in a BSS parameters field may indicate an APs' co-location with other APs (e.g., indicate that the AP is part of an MLE). The STA 412 may expect that member APs (e.g., first AP 406, second AP 408, and third AP 410) are neighbors of the reporting AP. While the AP MLD 402 may include multiple APs as members, any given member AP may advertise all or a subset of the multiple APs as candidate APs.

As illustrated, the STA 412 moves to the right from a first location directly beneath the first AP 406 to a second location directly below the second AP 408. The STA's movement may trigger a roaming or transition event wherein the STA and/or one or more of the first AP 406 and the second AP 408 determine that signaling from the second AP 408 is a higher quality relative to signaling from the first AP 406. The transition event may cause the first AP 406 to provide the STA 412 with link information associated with the second AP 408. For example, the link information may provide the STA 412 with a second active link 418 between the STA 412 and the second AP 408. Thus, during a transition process, the STA 412 may maintain two active links for communication with both the first AP 406 and the second AP 408.

In some examples, the first AP 406 may receive downlink data intended for the STA 412 from the router 414. The first AP 406 may transmit that downlink data to the STA 412 and also provide, via a backhaul link 404 or wireless link, the same downlink data to the second AP 408. The second AP 208 may transmit the downlink data to the STA 412 simultaneously with the first AP 406. This provides a redundant transmission to the STA 412 to ensure that the STA 412 reliably receives the downlink data during the transition process.

Once the transition process is complete, the STA 412 may cease to maintain the first active link 416 with the first AP 406, and the router 414 may route downlink data intended for the STA 412 to the second AP 408. The second AP 408 may maintain the MLD context for the STA 412.

In certain aspects, an AID may be assigned at initialization of each STA. For example, the STA 412 may have an association identifier (AID) assigned by the first AP 406 (e.g., when the STA 412 joins the network). The AID may identify the STA within an area such as a BSS, and may be used as an address or a part of an address, and may be shorter than other addresses of the STA 412 such as an IP address or a MAC address. For example, an AID may be a length of 3-4 characters. The AID may be included in a frame to uniquely identify a sender or receiver of a message. For example, the AID may be included in a MAC header to identify a transmitting STA when the AID may be used for addressing a frame. Further, a PPDU header may include an AID or a partial AID that may be used as an early indication of an intended receiver of the frame. Advantageously, such a PPDU header may permit early termination of processing a received PPDU that is indicated to be for different receiver.

However, in a large network (e.g., a scenario with multiple APs that are part of an AP MLD 402), the 3-4 character length of the AID may not be enough to provide the STA with an AID that is unique across all of the APs. Thus, in certain aspects, an AP may provide an STA with an extended AID upon association between the AP and the STA. For example, if the STA 412 initially joins the network 400 by associating with the first AP 406, then the first AP 406 may provide the STA 412 with an extended AID.

In some examples, the extended AID may be a tuple that includes a first value and a second value to extend the characters of the AID to greater than 3-4 characters. In certain aspects, the first value may include an access point identity (AP ID) associated with the first AP 406. The AP ID may be a unique value within an ESS, a globally unique medium access control (MAC) address that is included in frames transmitted by the AP, an Internet protocol (IP) address, etc. The second value may include a first local ID assigned to an STA by an AP, or the STA itself. In one embodiment, the local ID may have 12 bits.

Accordingly, the STA 412 may initially associate with the first AP 406 when it enters the network 400. The first AP 406 may provide the STA 412 with an extended AID in the form of a tuple that includes a first value that is an AP ID and a second value that is a first local ID. As the STA 412 moves through the network 400, the STA 412 may establish a link with the second AP 408 as described above (e.g., there is no re-association with APs that form the AP MLD 402), and the second AP 408 may update the tuple by providing the STA 412 with a third value that includes a new local ID (e.g., second local ID). Thus, the AID of the STA 412 may change from the AP ID and first local ID (e.g., (AP ID, first local ID)) to the AP ID and second local ID (e.g., (AP ID, second local ID)).

Accordingly, the local ID part of the extended AID tuple may change as the STA 412 establishes links with other APs within the AP MLD 402, but the AP ID may remain the same.

In certain aspects, the APs of the AP MLD 402 may use a modified traffic indication map (TIM) element to communicate the extended AID tuple to the STA 412. For example, the first AP 406 may transmit the TIM in a beacon or other management frame used to provide the STA 412 with channel identification, timing synchronization, etc. for communication with the AP 406. Alternatively, the modified TIM may be carried in a frame that follows the beacon frame. In this example, the beacon frame may include an indication that a TIM carrying the extended AID will be provided in a follow-up frame.

In certain aspects, a single physical AP (e.g., first AP 406) may be capable of wireless communication with the STA 412 via one or more of multiple links (e.g., a first link via 2.4 GHZ, a second link via 5 GHZ, a third link via 6 GHZ, etc.). For example, the STA 412 may communicate with the first AP 406 using a 2.4 GHz link and a 5 GHZ link. In this example, the 2.4 GHz link and the 5 GHz link may be referred to as a "collocated set" corresponding to the links of a single AP that the STA uses for communication with the AP. The number and frequency of the links used may depend on STA 412 capabilities.

In some examples, an AP may assign an identifier (e.g., "collocated ID") to each collocated set of links. For example, a combination of a 2.4 GHz link and a 5 GHZ link may be associated with a first collocated ID, a combination of the 5 GHz link and a 6 GHz link may be associated with a second collocated ID, a combination of the 2.4 GHZ link and the 6 GHz link may be associated with a third collocated ID, and a combination of the 2.4 GHz link, the 5 GHz link, and the 6 GHz link may be associated with a fourth collocated ID.

The AP may provide an STA with one extended AID per collocated set used by the AP and STA. For example, the extended AID may be a tuple that includes a first value and a second value. The first value may be a collocated ID corresponding to the collocated set used between the AP and STA, and the second value may be an AID. Thus, if the STA 412 and the first AP 406 establish communication over a collocated set of links that include a combination of the 2.4 GHz link and the 5 GHz link, the first AP 406 may generate and provide an extended AID to the STA 412, wherein that extended AID includes a tuple of the first collocated ID and a standard 3-4 character AID (e.g., as described in 802.11ax or 802.11be). Accordingly, the extended AID includes more characters than the AID alone, allowing for a greater ability to provide a unique identifier.

In certain aspects, an AP may also assign the STA an extended link ID containing more than the four characters of a standard link ID (e.g., as described in 802.11ax or 802.11be). For example, the extended link ID may be defined by a tuple having a first value and a second value. The first value may include a collocated set ID, and the second value may include a standard link ID configured to identify a particular link of the AP (e.g., a 2.4 GHz link, a 5 GHz link, etc.).

Each physical AP of the AP MLD 402 may be assigned a collocated set ID. The collocated set ID may be unique for each AP affiliated with the same AP MLD. Note that the collocated set ID may be different from an AP MLD ID, which is an identifier of a specific AP MLD in a physical AP. Thus, the extended link ID tuple may be configured to identify both a particular AP that is serving an STA, as well as a particular link used for communication between the AP and STA.

It should be noted, a link ID may fulfill a purpose different from an AID. The link ID may be used by a non-AP MLD to uniquely identify one AP from multiple APs affiliated within an AP MLD. In some examples, all the affiliated APs may be collocated (e.g., 802.11be). Accordingly, a 4-bit link ID is enough to accommodate at most 16 affiliated APs. Thus, the extended link ID provides a means for uniquely identifying a larger number of APs affiliated an AP MLD that the 4-bit link ID cannot. Accordingly, the extended link ID tuple (e.g., (collocated ID, link ID)) may provide the non-AP MLD with the ability to uniquely identify a specific AP affiliated with an AP MLD.

FIG. 5 shows a flowchart illustrating an example process 500 performable by an STA (e.g., non-AP MLD). The operations of the process 500 may be implemented by an STA as described herein. For example, the process 500 may be performed by a wireless communication device, such as the wireless communication device 104 described with reference to FIG. 1 and STA 412 in reference to FIG. 4.

In some examples, in block 502, the STA may obtain, from a first AP, a first identifier (ID) comprising a first value and a second value. Here, an AP that the STA initially communicates with may configure the STA with an extended AID and/or an extended link ID.

In some examples, in block 504, the STA may obtain, from a second AP, a third value associated with a transition of the apparatus from the first AP to the second AP. Here, if the STA moves to another location (e.g., mobile STA), then the STA may transition to another AP for communication. The other AP may update a portion of the extended AID and/or extended ID.

In some examples, in block 506, the STA may update the second value with the third value to generate a second ID for communications with the second AP, wherein the second ID is a second tuple comprising the first value and the third value. That is, the AP may update one of the values of the tuple to generate a new extended AID or new extended link ID.

In certain aspects, the first AP and the second AP are associated with an AP multi-link device (MLD).

In certain aspects, the first ID is a first association ID (AID) assigned to the apparatus by the first AP, wherein the second ID is a second AID, wherein the first value is an AP ID of the first AP, wherein the second value is a first local ID of the first AP, and wherein the third value is a second local ID of the second AP.

In certain aspects, the first ID is obtained via a traffic indication map (TIM).

In certain aspects, the first ID is a first extended association ID (AID) assigned to the apparatus by the first AP, the second ID is a second extended AID, wherein the first value is a first collocated ID of the first AP, wherein the second value is a first AID, and wherein the third value is a second collocated ID of the second AP.

In certain aspects, the first ID is a first extended link ID assigned to the apparatus by the first AP, the second ID is a second extended link ID, wherein the first value is a first collocated set ID of the first AP, wherein the second value is a first link ID, and wherein the third value is one of a second collocated set ID of the second AP or a second link ID assigned to the apparatus by the first AP or the second AP.

FIG. 6 shows a flowchart illustrating an example process 600 performable by an STA (e.g., non-AP MLD). The operations of the process 600 may be implemented by an STA as described herein. For example, the process 600 may be performed by a wireless communication device, such as the wireless communication device 104 described with reference to FIG. 1 and STA 412 in reference to FIG. 4. One or more blocks of the process 600 may be performed in conjunction with the process 500 of FIG. 5.

In some examples, in block 602, the STA may obtain, from the second AP, a fourth value obtained during the transition from the first AP to the second AP, the fourth value being a second AID assigned to the apparatus by the second AP. Here, another AP may update both values of the tuple.

In some examples, in block 604, the STA may update the first value with the fourth value to generate a third ID for communications with the second AP, wherein the third ID is a third tuple comprising the fourth value and the third value.

In certain aspects, the first collocated ID is configured to identify a first set of collocated links of the first AP used by the apparatus for communications with the first AP, and wherein the second collocated ID is configured to identify a second set of collocated links of the second AP used by the apparatus for communications with the second AP.

In certain aspects, an extended AID comprises more characters than an AID.

FIG. 7 shows a flowchart illustrating an example process 700 performable by an STA (e.g., non-AP MLD). The operations of the process 700 may be implemented by an STA as described herein. For example, the process 700 may be performed by a wireless communication device, such as the wireless communication device 104 described with reference to FIG. 1 and STA 412 in reference to FIG. 4. One or more blocks of the process 700 may be performed in conjunction with the processes of FIGS. 5 and/or 6.

In some examples, in block 702, the STA may obtain, from the second AP, a fourth value obtained during the transition from the first AP to the second AP, the fourth value being the other of the second collocated set ID or the second link ID.

In some examples, in block 704, the STA may update the first value with the fourth value to generate a third ID for communications with the second AP, wherein the third ID is a third tuple comprising the fourth value and the third value.

In certain aspects, the first collocated set ID is configured to identify a first set of multiple collocated APs including the first AP within a multi-link device (MLD) AP, wherein the second collocated set ID is configured to identify a second set of multiple collocated APs including the second AP within the MLD AP, wherein the first link ID is configured to identify a first link for communications between the apparatus and the first AP, and wherein the second link ID is configured to identify a second link for communications between the apparatus and the second AP.

In certain aspects, an extended link ID comprises more characters than a link ID.

Figure 8:
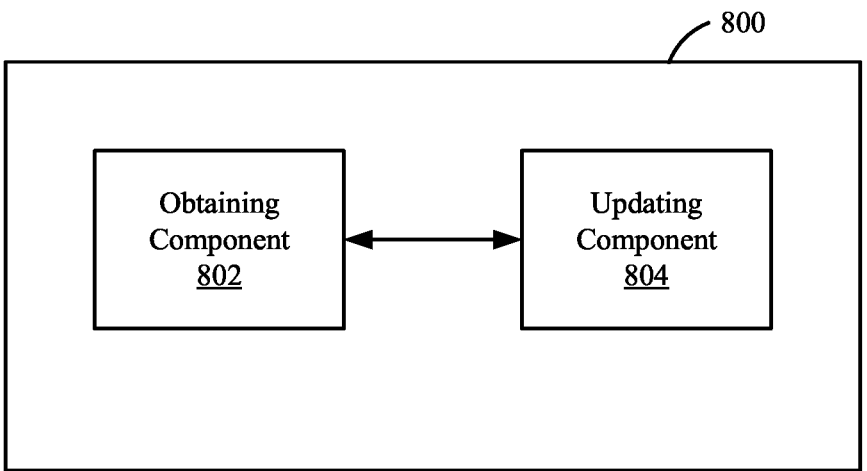
FIG. 8 shows a block diagram of an example wireless communication device that supports multi-AP association.

FIG. 8 shows a block diagram of an example wireless communication device 800 that supports extended AID and extended link ID communications, according to some aspects of the present disclosure. In some examples, the wireless communication device 800 is configured or operable to perform the process LLL00 described with reference to Figure LLL. In various examples, the wireless communication device 800 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 800 can be a device for use in an AP, such as AP 102 described with reference to FIG. 1. In some other examples, the wireless communication device 800 can be an AP that includes such a chip, SoC, chipset, package or device as well as multiple antennas. The wireless communication device 800 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 800 also includes or can be coupled with an application processor which may be further coupled with another memory. In some examples, the wireless communication device 800 further includes at least one external network interface that enables communication with a core network or backhaul network to gain access to external networks including the Internet.

The wireless communication device 800 includes an obtaining component 802 and an updating component 804.

Portions of one or more of the components 802 and 804 may be implemented at least in part in hardware or firmware. For example, the obtaining component 802 may be implemented at least in part by an antenna and a modem. In some examples, at least some of the components 802 and 804 are implemented at least in part by a processor and as software stored in a memory. For example, portions of one or more of the components can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 800). For example, a processing system of the device 800 may refer to a system including the various other components or subcomponents of the device 800, such as the processor, or a transceiver, or a communications manager, or other components or combinations of components of the device 800. The processing system of the device 800 may interface with other components of the device 800, and may process information received from other components (such as inputs or signals) or output information to other components. For example, a chip or modem of the device 800 may include a processing system, a first interface to output information and a second interface to obtain information. In some implementations, the first interface may refer to an interface between the processing system of the chip or modem and a transmitter, such that the device 800 may transmit information output from the chip or modem. In some implementations, the second interface may refer to an interface between the processing system of the chip or modem and a receiver, such that the device 800 may obtain information or signal inputs, and the information may be passed to the processing system. A person having ordinary skill in the art will readily recognize that the first interface also may obtain information or signal inputs, and the second interface also may output information or signal outputs.

The obtaining component 802 is capable of, configured to, or operable to obtain, from a first AP, a first identifier (ID) comprising a first value and a second value; obtain, from a second AP, a third value associated with a transition of the apparatus from the first AP to the second AP; obtain, from the second AP, a fourth value obtained during the transition from the first AP to the second AP, the fourth value being a second AID assigned to the apparatus by the second AP; and obtain, from the second AP, a fourth value obtained during the transition from the first AP to the second AP, the fourth value being the other of the second collocated set ID or the second link ID.

The updating component 804 is capable of, configured to, or operable to update the second value with the third value to generate a second ID for communications with the second AP, wherein the second ID is a second tuple comprising the first value and the third value; update the first value with the fourth value to generate a third ID for communications with the second AP, wherein the third ID is a third tuple comprising the fourth value and the third value; and update the first value with the fourth value to generate a third ID for communications with the second AP, wherein the third ID is a third tuple comprising the fourth value and the third value.

Figure 9:
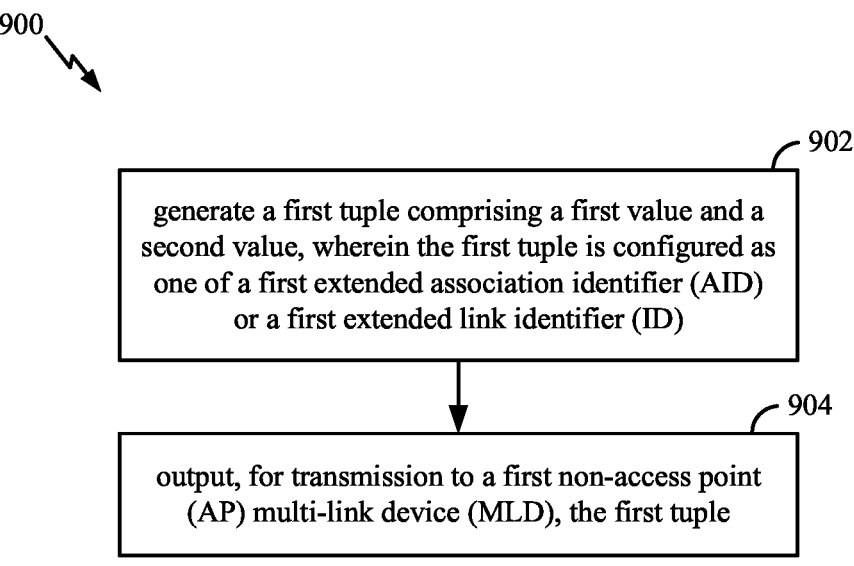
FIG. 9 shows a flowchart illustrating an example process performable by a wireless STA that supports multi-AP association.

FIG. 9 shows a flowchart illustrating an example process 900 performable by an AP (e.g., AP that forms part of an AP MLD). The operations of the process 900 may be implemented by an AP as described herein. For example, the process 900 may be performed by a wireless communication device, such as the wireless communication device 102 described with reference to FIG. 1 and the first AP 406, the second AP 408, and/or the third AP 410 in reference to FIG. 4, operating as or within a wireless AP.

In some examples, in block 902, the wireless AP may generate a first tuple comprising a first value and a second value, wherein the first tuple is configured as one of a first extended association identifier (AID) or a first extended link identifier (ID).

In block 904, the wireless AP may output, for transmission to a first non-access point (AP) multi-link device (MLD), the first tuple.

In certain aspects, the apparatus is associated with an AP MLD.

In certain aspects, the first tuple is configured as the first extended AID, wherein the first value is an AP ID of the apparatus, and wherein the second value is a first local ID of the apparatus.

In certain aspects, the first tuple is configured as the first extended AID, wherein the first value is a collocated ID of the apparatus, wherein the second value is a first AID, and wherein the first collocated ID is configured to identify a first set of collocated links used by the apparatus for communications with the non-AP MLD.

In certain aspects, the first tuple is configured as the first extended link ID, wherein the first value is a first collocated set ID of the apparatus, wherein the second value is a first link ID, and wherein the first collocated set ID is configured to identify a second set of multiple collocated APs including the apparatus.

In certain aspects, the first tuple is output for transmission via a traffic indication map (TIM).

Figure 10:
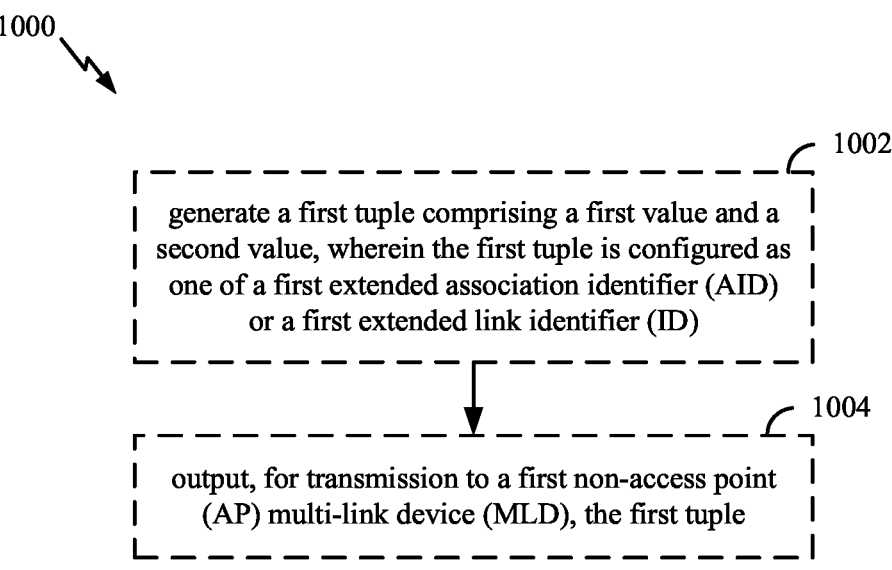
FIG. 10 shows a flowchart illustrating an example process performable by a wireless STA that supports multi-AP association.

FIG. 10 shows a flowchart illustrating an example process 1000 performable by an AP (e.g., AP that forms part of an AP MLD). The operations of the process 1000 may be implemented by an AP as described herein. For example, the process 1000 may be performed by a wireless communication device, such as the wireless communication device 102 described with reference to FIG. 1 and the first AP 406, the second AP 408, and/or the third AP 410 in reference to FIG. 4, operating as or within a wireless AP. The process 1000 may be performed in conjunction with the process 900 illustrated in FIG. 9.

In some examples, in block 1002, the wireless AP may generate a first tuple comprising a first value and a second value, wherein the first tuple is configured as one of a first extended association identifier (AID) or a first extended link identifier (ID).

In some examples, in block 1004, the wireless AP may output, for transmission to a first non-access point (AP) multi-link device (MLD), the first tuple.

Figure 11:
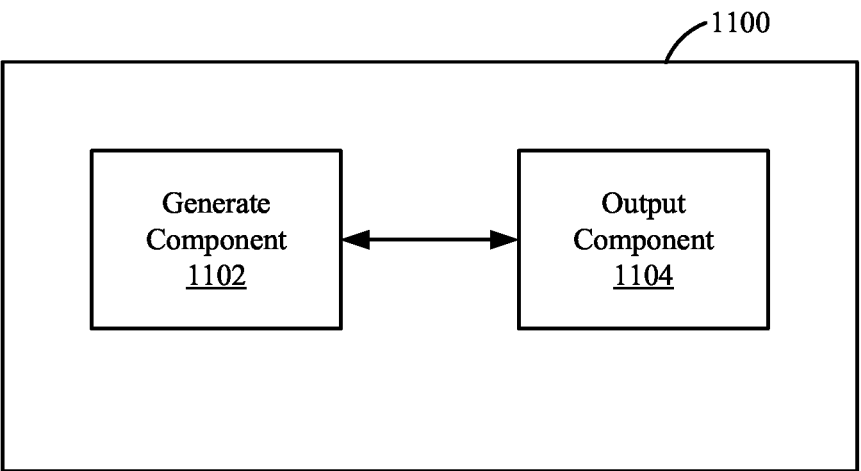
FIG. 11 shows a block diagram of an example wireless communication device that supports multi-AP association.

FIG. 11 shows a block diagram of an example wireless communication device 1100 that supports multiple AP association according to some aspects of the present disclosure. In some examples, the wireless communication device 1100 is configured or operable to perform the process 1000 described with reference to FIG. 10. In various examples, the wireless communication device 1100 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1100 can be a device for use in an AP MLD via an AP, such as AP 102 described with reference to FIG. 1. In some other examples, the wireless communication device 1100 can be an AP that includes such a chip, SoC, chipset, package or device as well as multiple antennas. The wireless communication device 1100 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1100 also includes or can be coupled with an application processor which may be further coupled with another memory. In some examples, the wireless communication device 1100 further includes at least one external network interface that enables communication with a core network or backhaul network to gain access to external networks including the Internet.

The wireless communication device 1100 includes a generate component 1102 and an output component 1104. Portions of one or more of the components may be implemented at least in part in hardware or firmware. For example, the output component 1104 may be implemented at least in part by a modem and/or an antenna. In some examples, at least some of the components are implemented at least in part by a processor and as software stored in a memory. For example, portions of one or more of the components can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1100). For example, a processing system of the device 1100 may refer to a system including the various other components or subcomponents of the device 1100, such as the processor, or a transceiver, or a communications manager, or other components or combinations of components of the device 1100. The processing system of the device 1100 may interface with other components of the device 1100 and may process information received from other components (such as inputs or signals) or output information to other components. For example, a chip or modem of the device 1100 may include a processing system, a first interface to output information and a second interface to obtain information. In some implementations, the first interface may refer to an interface between the processing system of the chip or modem and a transmitter, such that the device 1100 may transmit information output from the chip or modem. In some implementations, the second interface may refer to an interface between the processing system of the chip or modem and a receiver, such that the device 1100 may obtain information or signal inputs, and the information may be passed to the processing system. A person having ordinary skill in the art will readily recognize that the first interface also may obtain information or signal inputs, and the second interface also may output information or signal outputs.

The generate component 1102 is capable of, configured to, or operable to generate a first tuple comprising a first value and a second value, wherein the first tuple is configured as one of a first extended association identifier (AID) or a first extended link identifier (ID).

The output component 1104 is capable of, configured to, or operable to output, for transmission to a first non-access point (AP) multi-link device (MLD), the first tuple.

Figure 12:
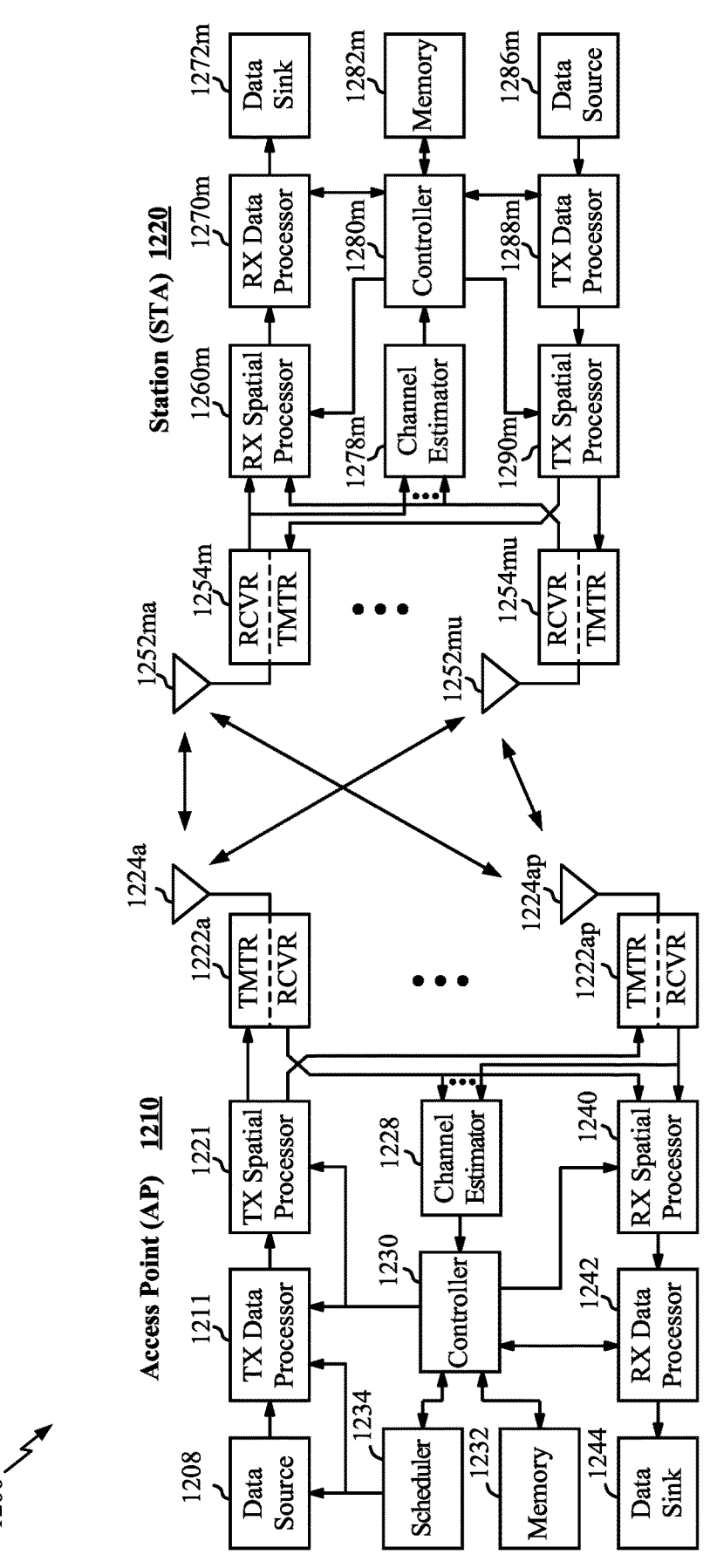
FIG. 12 shows a conceptual hardware component view of an AP and an STA.

FIG. 12 illustrates a block diagram 1200 of an STA 1220 and an AP 1210, which may be used to implement aspects of the present disclosure. For example, antennas 1224 and processors 1211, 1221, 1230, 1240, 1242 of the AP 1210 and/or antennas 1252 and processors 1260, 1270, 1280, 1288, 1290 of the STA 1220 may be used to perform the various techniques and methods described herein, such as the operations depicted in FIGS. 3-8.

The AP 1210 is equipped with antennas 1224a through 1224t. The STA 1220 is equipped with antennas 1252ma through 1252mu. The AP 1210 is a transmitting entity for the downlink and a receiving entity for the uplink. The STA 1220 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, $N_{up}$ user terminals are selected for simultaneous transmission on the uplink, Nan user terminals are selected for simultaneous transmission on the downlink, $N_{up}$ may or may not be equal to Nan, and $N_{up}$ and $N_{dn}$ may be static values or can change for each scheduling interval. The beam-steering or some other spatial processing technique may be used at the access point and user terminal.

On the uplink at the STA 1220, a TX data processor 1288m receives traffic data from a data source 1286m and control data from a controller 1280m. TX data processor 1288m processes (e.g., encodes, interleaves, and modulates) the traffic data for the STA based on the coding and modulation schemes associated with the rate selected for the STA and provides a data symbol stream. A TX spatial processor 1290m performs spatial processing on the data symbol stream and provides transmit symbol streams for the antennas. Each transmitter unit (TMTR) 1254m-1254mu receives and processes (e.g., converts to analog, amplifies, filters, and frequency upconverts) a respective transmit symbol stream to generate an uplink signal. The transmitter units 1254m provide uplink signals for transmission from antennas 1252m to the AP. The AP 1210 may include a memory 1232, and the STA 1220 may include a memory 1282m.

$N_{up}$ STAs may be scheduled for simultaneous transmission on the uplink. Each of these STAs may perform spatial processing on its data symbol stream and transmits its set of transmit symbol streams on the uplink to the AP.

At the AP 1210, antennas 1224a through 1224ap receive the uplink signals from all $N_{up}$ STAs transmitting on the uplink. Each antenna 1224 provides a received signal to a respective receiver unit (RCVR) 1222a-1222ap. Each receiver unit 1222 performs processing complementary to that performed by transmitter unit 1254 and provides a received symbol stream. An RX spatial processor 1240 performs receiver spatial processing on the received symbol streams from receiver units 1222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 1242 processes (e.g., demodulates, deinterleaves, and decodes) each recovered uplink data symbol stream in accordance with the rate used for that stream to obtain decoded data. The decoded data for each user terminal may be provided to a data sink 1244 for storage and/or a controller 1230 for further processing.

On the downlink, at AP 1210, a TX data processor 1211 receives traffic data from a data source 1208 for $N_{dn}$ user terminals scheduled for downlink transmission, control data from a controller 1230, and possibly other data from a scheduler 1234. The various types of data may be sent on different transport channels. TX data processor 1211 processes (e.g., encodes, interleaves, and modulates) the traffic data for each user terminal based on the rate selected for that STA. TX data processor 1211 provides $N_{dn}$ downlink data symbol streams for the $N_{dn}$ STAs. A TX spatial processor 1221 performs spatial processing (such as a precoding or beamforming, as described in the present disclosure) on the $N_{dn}$ downlink data symbol streams, and provides transmit symbol streams for the antennas. Each transmitter unit 1222 receives and processes a respective transmit symbol stream to generate a downlink signal. The transmitter units 1222 providing downlink signals for transmission from antennas 1224 to the STA.

At the STA 1220, antennas 1252m receive the downlink signals from the AP 1210. Each receiver unit 1254m processes a received signal from an associated antenna 1252m and provides a received symbol stream. An RX spatial processor 1260m performs receiver spatial processing on received symbol streams from receiver units 1254m and provides a recovered downlink data symbol stream for the STA 1220. The receiver spatial processing is performed in accordance with the CCMI, MMSE or some other technique. An RX data processor 1270m processes (e.g., demodulates, deinterleaves and decodes) the recovered downlink data symbol stream to obtain decoded data for the STA.

At the STA 1220, a channel estimator 1278m estimates the downlink channel response and provides downlink channel estimates, which may include channel gain estimates, SNR estimates, noise variance and so on. Similarly, a channel estimator 1228 of the AP 1210 estimates the uplink channel response and provides uplink channel estimates. Controller 1280m of the STA typically derives the spatial filter matrix for the STA based on the downlink channel response matrix $H_{dn,m}$ for that STA. Controller 1230 derives the spatial filter matrix for the access point based on the effective uplink channel response matrix $H_{up,eff}$. Controller 1280m of the STA may send feedback information (e.g., the downlink and/or uplink eigenvectors, eigenvalues, SNR estimates, and so on) to the AP. Controllers 1230 and 1280m also control the operation of various processing units at the AP 1210 and the STA 1220, respectively.

Additional Considerations

Means for receiving or means for obtaining may include a receiver (such as the receive processors 1240/1242 and 1260m/1270m) and/or an antenna(s) 1224a/1252ma of the AP 1210 and STA 1220 illustrated in FIG. 12. Means for transmitting or means for outputting may include a transmitter (such as transmit processors 1211/1221 and 1290m/1288m) and/or an antenna(s) 1224a/1252ma of the AP 1210 and STA 1220 illustrated in FIG. 3. Means for generating and/or updating may include a processing system, which may include one or more processors, such as controllers

1230/1280*m* and memory 1232/1282*m* of the AP 1210 and STA 1220 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "establishing" (or any variants thereof such as "establish") encompasses a wide variety of actions. For example, "establishing" may include forming, generating, setting up, initiating, creating, and the like. As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a–b, a–c, b–c, and a–b–c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

EXAMPLE ASPECTS

Example 1 is a method for wireless communication at a non-access point multi-link device (MLD), comprising: obtaining, from a first AP, a first identifier (ID) comprising a first value and a second value; obtaining, from a second AP, a third value associated with a transition of the non-AP MLD from the first AP to the second AP; and updating the second value with the third value to generate a second ID for communications with the second AP, wherein the second ID is a second tuple comprising the first value and the third value.

Example 2 is the method of example 1, wherein the first AP and the second AP are associated with an AP MLD.

Example 3 is the method of any of examples 1 and 2, wherein the first ID is a first association ID (AID) assigned to the non-AP MLD by the first AP, wherein the second ID is a second AID, wherein the first value is an AP ID of the first AP, wherein the second value is a first local ID of the first AP, and wherein the third value is a second local ID of the second AP.

Example 4 is the method of any of examples 1-3, wherein the first ID is obtained via a traffic indication map (TIM).

Example 5 is the method of any of examples 1-4, wherein the first ID is a first extended association ID (AID) assigned to the non-AP MLD by the first AP, the second ID is a second extended AID, wherein the first value is a first collocated ID of the first AP, wherein the second value is a first AID, and wherein the third value is a second collocated ID of the second AP.

Example 6 is the method of example 5, further comprising: obtaining, from the second AP, a fourth value obtained during the transition from the first AP to the second AP, the fourth value being a second AID assigned to the non-AP MLD by the second AP; and updating the first value with the fourth value to generate a third ID for communications with the second AP, wherein the third ID is a third tuple comprising the fourth value and the third value.

Example 7 is the method of example 5, wherein the first collocated ID is configured to identify a first set of collocated links of the first AP used by the non-AP MLD for communications with the first AP, and wherein the second collocated ID is configured to identify a second set of collocated links of the second AP used by the non-AP MLD for communications with the second AP.

Example 8 is the method of example 5, wherein an extended AID comprises more characters than an AID.

Example 9 is the method of any of examples 1-4, wherein the first ID is a first extended link ID assigned to the non-AP MLD by the first AP, the second ID is a second extended link ID, wherein the first value is a first collocated set ID of the first AP, wherein the second value is a first link ID, and wherein the third value is one of a second collocated set ID of the second AP or a second link ID assigned to the non-AP MLD by the first AP or the second AP.

Example 10 is the method of example 9, further comprising: obtaining, from the second AP, a fourth value obtained during the transition from the first AP to the second AP, the fourth value being the other of the second collocated set ID or the second link ID; and updating the first value with the fourth value to generate a third ID for communications with the second AP, wherein the third ID is a third tuple comprising the fourth value and the third value.

Example 11 is the method of example 9, wherein the first collocated set ID is configured to identify a first set of multiple collocated APs including the first AP within a multi-link device (MLD) AP, wherein the second collocated set ID is configured to identify a second set of multiple collocated APs including the second AP within the MLD AP, wherein the first link ID is configured to identify the first AP, and wherein the second link ID is configured to identify the second AP.

Example 12 is the method of example 9, wherein an extended link ID comprises more characters than a link ID.

Example 13 is a method of wireless communication at an access point (AP), comprising: generating a first tuple comprising a first value and a second value, wherein the first tuple is configured as one of a first extended association identifier (AID) or a first extended link identifier (ID); and outputting, for transmission to a first non-access point (AP) multi-link device (MLD), the first tuple.

Example 14 is the method of example 13, further comprising: obtaining, from a second non-AP MLD, a second tuple comprising a third value and a fourth value, wherein obtaining the second tuple is associated with a transition of the second non-AP MLD to the AP from another AP; and updating the third value with a fifth value to generate a third tuple for communications between the AP and the second non-AP MLD, wherein the third tuple is configured as a second AID or a second link ID.

Example 15 is the method of any of examples 13 and 14, wherein the AP is associated with an AP MLD.

Example 16 is the method of any of examples 13-15, wherein the first tuple is configured as the first extended AID, wherein the first value is an AP ID of the AP, and wherein the second value is a first local ID of the AP.

Example 17 is the method of any of examples 13-16, wherein the first tuple is configured as the first extended AID, wherein the first value is a collocated ID of the AP, wherein the second value is a first AID, and wherein the first collocated ID is configured to identify a first set of collocated links used by the AP for communications with the first non-AP MLD.

Example 18 is the method of any of examples 13-17, wherein the first tuple is configured as the first extended link ID, wherein the first value is a first collocated set ID of the AP, wherein the second value is a first link ID, and wherein the first collocated set ID is configured to identify a second set of multiple collocated APs including the AP.

Example 19 is the method of any of examples 13-18, wherein the first tuple is output for transmission via a traffic indication map (TIM).

Example 20 is a non-access point (AP) multi-link device (MLD), comprising: a transceiver; a memory comprising instructions; and one or more processors configured to execute the instructions to cause the non-AP MLD to perform a method in accordance with any one of examples 1-12, wherein the transceiver is configured to: receive the first ID; and receive the third value.

Example 21 is an access point, comprising: a transceiver; a memory comprising instructions; and one or more processors configured to execute the instructions and cause the network node to perform a method in accordance with any one of examples 13-19, wherein the transceiver is configured to: transmit the first tuple.

Example 22 is an apparatus for wireless communications, comprising means for performing a method in accordance with any one of examples 1-12.

Example 23 is an apparatus for wireless communications, comprising means for performing a method in accordance with any one of examples 13-19.

Example 24 is a non-transitory computer-readable medium comprising instructions that, when executed by an apparatus, cause the apparatus to perform a method in accordance with any one of examples 1-12.

Example 25 is a non-transitory computer-readable medium comprising instructions that, when executed by an apparatus, cause the apparatus to perform a method in accordance with any one of examples 13-19.

Example 26 is an apparatus for wireless communications, comprising: a memory comprising instructions; and one or more processors configured to execute the instructions to cause the apparatus to perform a method in accordance with any one of examples 1-12.

Example 27 is apparatus for wireless communications, comprising: a memory comprising instructions; and one or more processors configured to execute the instructions to cause the apparatus to perform a method in accordance with any one of examples 13-19.

What is claimed is:

1. An apparatus configured for wireless communication, comprising:
at least one transceiver;
at least one memory comprising instructions; and
one or more processors configured to execute the instructions and cause the apparatus to:
receive, from a first AP via the at least one transceiver, a first identifier (ID) comprising a first value and a second value, wherein the first ID is configured as one of a first extended association identifier (AID) or a first extended link identifier (ID);
receive, from a second AP via the at least one transceiver, a third value associated with a transition of the apparatus from the first AP to the second AP;
update the second value with the third value to generate a second ID associated with communications with the second AP, wherein the second ID comprises the first value and the third value;

receive, from the second AP via the at least one transceiver and during the transition, a fourth value comprising a second AID assigned to the apparatus; and update the first value with the fourth value to generate a third ID associated with communications with the second AP, wherein the third ID comprises the third value and the fourth value.

2. The apparatus of claim 1, wherein the first AP and the second AP are associated with an AP multi-link device (MLD).

3. The apparatus of claim 1, wherein the first ID is configured as a first association ID (AID) assigned to the apparatus, wherein the second ID is configured as a second AID, wherein the first value is configured as an AP ID of the first AP, wherein the second value is configured as a first local ID of the first AP, and wherein the third value is configured as a second local ID of the second AP.

4. The apparatus of claim 1, wherein the first ID is received via a traffic indication map (TIM) of a beacon frame or via a frame following the beacon frame, and further wherein the beacon frame comprises an indication of the first AP if the first ID is received via the frame following the beacon frame.

5. The apparatus of claim 1, wherein the first ID is configured as the first extended AID assigned to the apparatus, the second ID is configured as a second extended AID, wherein the first value is configured as a first collocated ID of the first AP, wherein the second value is configured as a first AID, and wherein the third value is configured as a second collocated ID of the second AP.

6. The apparatus of claim 5, wherein the first collocated ID is configured to identify a first set of collocated links of the first AP used by the apparatus for communications with the first AP, and wherein the second collocated ID is configured to identify a second set of collocated links of the second AP used by the apparatus for communications with the second AP.

7. The apparatus of claim 5, wherein the first extended AID comprises more characters than the first AID, and wherein the second extended AID comprises more characters than the second AID.

8. The apparatus of claim 1, wherein the first ID is configured as the first extended link ID assigned to the apparatus, the second ID is configured as a second extended link ID, wherein the first value is configured as a first collocated set ID of the first AP, wherein the second value is configured as a first link ID, and wherein the third value is configured as a second collocated set ID of the second AP.

9. The apparatus of claim 8, wherein the first collocated set ID is configured to identify a first set of multiple collocated APs including the first AP within a multi-link device (MLD) AP, wherein the second collocated set ID is configured to identify a second set of multiple collocated APs including the second AP within the MLD AP, wherein the first link ID is configured to identify the first AP, and wherein the second extended link ID is configured to identify the second AP.

10. The apparatus of claim 8, wherein each of the first extended link ID and the second extended link ID comprise more characters than the first link ID.

11. An apparatus configured for wireless communication, comprising:

at least one transceiver;

at least one memory comprising instructions; and one or more processors configured to execute the instructions and cause the apparatus to:

generate a first identifier (ID) comprising a first value and a second value, wherein the first ID is configured as one of a first extended association identifier (AID) or a first extended link identifier (ID);

transmit, to a first non-access point (AP) multi-link device (MLD) via the at least one transceiver, the first ID;

receive, from a second non-AP MLD via the at least one transceiver, a second ID comprising a third value and a fourth value, wherein receiving the second ID is associated with a transition of the second non-AP MLD from an AP to the apparatus; and update the third value with a fifth value to generate a third ID associated with communications between the apparatus and the second non-AP MLD, wherein the third ID is configured as a second AID or a second extended link ID.

12. The apparatus of claim 11, wherein the apparatus is associated with an AP MLD.

13. The apparatus of claim 11, wherein the first ID is configured as the first extended AID, wherein the first value is an AP ID of the apparatus, and wherein the second value is configured as a first local ID of the apparatus.

14. The apparatus of claim 11, wherein the first ID is configured as the first extended AID, wherein the first value is configured as a collocated ID of the apparatus, wherein the second value is configured as a first AID, and wherein the first collocated ID is configured to identify a first set of collocated links used by the apparatus for communications with the first non-AP MLD.

15. The apparatus of claim 11, wherein the first ID is configured as the first extended link ID, wherein the first value is configured as a first collocated set ID of the apparatus, wherein the second value is configured as a first link ID, and wherein the first collocated set ID is configured to identify a second set of multiple collocated APs including the apparatus.

16. The apparatus of claim 11, wherein the apparatus is configured as an AP.

17. A non-access point (AP) multi-link device (MLD), comprising:

at least one transceiver;

at least one memory comprising instructions; and one or more processors configured to execute the instructions and cause the non-AP MLD to:

receive, from a first AP via the at least one transceiver, a first identifier (ID) comprising a first value and a second value, wherein the first ID is configured as one of a first extended association identifier (AID) or a first extended link identifier (ID);

receive, from a second AP via the at least one transceiver, a third value associated with a transition of the non-AP MLD from the first AP to the second AP;

update the second value with the third value to generate a second ID associated with communications with the second AP, wherein the second ID comprises the first value and the third value;

receive, from the second AP via the at least one transceiver, a fourth value during the transition, the fourth value being a second AID assigned to the non-AP MLD; and update the first value with the fourth value to generate a third ID for communications with the second AP, wherein the third ID comprises the fourth value and the third value.

* * * * *